United States Patent
Singh et al.

(10) Patent No.: US 11,775,271 B1
(45) Date of Patent: Oct. 3, 2023

(54) ANNOTATIONS FOR DEVELOPERS

(71) Applicant: Google LLC, Mountain View, CA (US)

(72) Inventors: Rishabh Singh, Mountain View, CA (US); Artem Goncharuk, Mountain View, CA (US); Karen Davis, Portola Valley, CA (US); David Andre, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 194 days.

(21) Appl. No.: 17/316,331

(22) Filed: May 10, 2021

Related U.S. Application Data

(60) Provisional application No. 63/025,762, filed on May 15, 2020.

(51) Int. Cl.
  *G06F 9/44*   (2018.01)
  *G06F 8/51*   (2018.01)
  *G06N 3/08*   (2023.01)
  *G06N 3/04*   (2023.01)

(52) U.S. Cl.
  CPC ............... *G06F 8/51* (2013.01); *G06N 3/04* (2013.01); *G06N 3/08* (2013.01)

(58) Field of Classification Search
  CPC ............. G06F 8/51; G06N 3/04; G06N 3/08
  USPC ............. 717/136–137, 145–148; 706/12, 15
  See application file for complete search history.

(56) References Cited

U.S. PATENT DOCUMENTS

| | | | | |
|---|---|---|---|---|
| 10,133,738 B2* | 11/2018 | Huang | ..................... | G06F 40/44 |
| 10,613,844 B2* | 4/2020 | Ravindar | ................ | G06F 8/443 |
| 2014/0358519 A1* | 12/2014 | Mirkin | ..................... | G06F 40/47 |
| | | | | 704/2 |
| 2020/0286002 A1* | 9/2020 | Szanto | ................... | G06N 20/20 |

OTHER PUBLICATIONS

Robin Eklind, "Compositional Decompilation using LLVM IR", 2015, University of Portsmouth, England, 112 pages. (Year: 2015).*
Deborah Katz et al., "Using Recurrent Neural Networks for Decompilation", 2018, IEEE, pp. 346-356. (Year: 2018).*
Omer Katz et al., "Towards Neural Decompilation", 2019, Computer Science-ArXiv, pp. 1-18 (Year: 2019).*
Nikita Vemuri, "Scoring Confidence in Neural Networks", 2020, University of California at Berkeley, 36 pages. (Year: 2020).*

* cited by examiner

*Primary Examiner* — Ted T. Vo
(74) *Attorney, Agent, or Firm* — Gray Ice Higdon

(57) ABSTRACT

Techniques are described herein for translating source code in one programming language to source code in another programming language using machine learning. A method includes: receiving first source code in a first higher-level programming language; processing the first source code, or an intermediate representation thereof, using a sequence-to-sequence neural network model to generate a sequence of outputs, each including a probability distribution; generating second source code in a second higher-level programming language by, for each output in the sequence of outputs: determining a highest probability in the probability distribution associated with the output; in response to the highest probability exceeding a first threshold, generating a predicted portion of the second source code based on a token that corresponds to the highest probability; and in response to the highest probability not exceeding the first threshold, generating a placeholder; and outputting the second source code.

18 Claims, 7 Drawing Sheets

```
// print the integers from 1 to 5
for (int i = 1; i < 6; i++)
{
    System.out.println(i);
}

MyCustomObject object1 = new MyCustomObject();
object1.doSomething();
```
600

CODE TRANSLATOR 104

TRANSLATION OF SOURCE CODE FROM JAVA TO PYTHON    610

```
          # print the integers from 1 to 5
[[.95]]   for i in range(1,6):
[[.95]]      print i

[[.60]]   object1 = MyCustomObject()

[[PH]]    # Java:  object1.doSomething();
```

ANNOTATIONS FOR DEVELOPERS

BACKGROUND

Computer software programming often requires developers to read and/or write source code (i.e., to program) in a specific higher-level programming language. Some non-limiting examples of higher-level programming languages include Java, C++, C, Python, Perl, etc. —each of which can have its own strengths, weaknesses, nuances, idiosyncrasies, etc.

Many programmers obtain at least a superficial understanding of multiple programming languages but only master a few. Consequently, this can cause problems when an entity (e.g., a company) wants to translate code from a base higher-level programming language to a different target higher-level programming language. For example, existing programmers at the entity may lack expertise in the target programming language and be unable to manually translate the code and/or can be highly inefficient in doing so. The inefficiencies can lead to excess usage of client device resources utilized in translating the code. Put another way, the inefficiencies can result in a client device, being used in manually translating the code, to be on and/or in a higher-powered state for prolonged periods. Even if new programmer(s) familiar with the target language were brought in for the translating, manually translating is nonetheless still inefficient, at least due to the new programmer(s) being unfamiliar with the semantics of the base code being translated. Even outside of the automatic translating context, excess usage of client device resources can also occur when programmers attempt to code in a new language with which they have lesser expertise relative to other language(s). This can be due to the programmers being slower when coding in the new language which, in turn, prolongs the duration that client device resource(s) need to be active when coding in the new language.

SUMMARY

Implementations disclosed herein relate to utilization of machine learning model(s) in automatically translating source code in a "base" programming language to source code in another programming language, or "target" programming language. The machine learning models used to translate source code may include, e.g., neural network models, neural network ensembles, model pipelines including a first source code to first embedding to second embedding to second source code pipeline, etc. Implementations disclosed herein can enable automatic translation or partial translation of source code from the base programming language to the target programming language, while mitigating the amount of programmer time (and corresponding client device usage) that is involved. For example, some or all source code of a program can be translated from the base language to the target language, without requiring any human intervention. For instance, translated target language source code can optionally be presented to a programmer for review and potential editing, but the programmer will not be involved in the initial generation of the translated target language segment. Implementations disclosed herein can additionally or alternatively enable programmers who might be unfamiliar with a base programming language to nonetheless view and/or edit source code written in the base language by translating the source code to another programming language that is more familiar to the programmer.

In automatically translating source code of a program, programmed in a base programming language (e.g., C++), an intermediate representation can be generated. In some implementations, the intermediate representation can be a lower-level representation generated using a compiler for the base programming language that generates a lower-level compiled representation of the source code. As used herein, the "lower-level representation" can refer to bytecode, object code, binary code, assembly code, abstract syntax trees, or any other representation of source code that is less human-readable than source code from which the lower-level representation was generated. In other implementations, the intermediate representation can be a natural language intermediate representation. For example, a machine learning model can be used to translate the source code programmed in the base programming language to a natural language intermediate representation. For instance, the machine learning model can be trained based on training instances with base source code, natural language pairs. The natural language paired with a corresponding instance of source code in a training instance can be, for example, natural language that conforms to docstring(s) for the instance of source code or is based on such docstring(s) (e.g., a variant that omits and/or replace(s) term(s) of the docstring(s)). In other implementations, the natural language paired with a corresponding instance of source code in a training instance can be, for example, comments in the source code and/or other types of documentation, e.g., comments to changes or commits in a source control system or version control system, test documentation, etc.

The intermediate representation (e.g., lower-level compiled representation or natural language representation) can then be processed using machine learning model(s) to generate output(s) indicative of corresponding source code in the target language. For example, when the intermediate representation is a lower-level compiled representation, it can be processed using a "neural decompiler", which can be a machine learning model trained to decompile lower-level representations to a target higher-level programming language (e.g., Python), to generate output(s). As another example, when the intermediate representation is a natural language intermediate representation, it can be processed using a machine learning model trained to translate the natural language intermediate representation to the target higher-level programming language, to generate output(s).

In some implementations, the machine learning model can be a sequence-to-sequence neural network model that processes the intermediate representation to generate a sequence of outputs, such as a sequence of outputs that each include a probability distribution over tokens. Each of the tokens can be a word, word piece, symbol, and/or other token, and the tokens can include those that form a lexicon of the target higher-level programming language, and optionally other tokens (e.g., end of code snippet symbols, canonical variables and/or other variables, etc.). In various implementations, the machine learning model can be trained based on training instances that each include labeled training instance output of a target source code portion that is in a target programming language, and training instance input that is an intermediate representation (e.g., lower-level representation or natural language representation) of the target source code portion. Where the intermediate representation is the lower-level representation, the training instances can be generated by identifying (e.g., from code repositories) target source code portions, and compiling the target source code portions using a compiler for the target higher-level programming language. Each training instance can include a target source code portion (as output), and its corresponding lower-level compiled representation. Where the intermediate representation is the natural language representation, the training instances can be generated by identifying (e.g., from code repositories) target source code portions, and docstrings and/or other comments for the target source code portions. Each training instance can include a target source code portion (as output), and its corresponding docstring (or variation thereof) (as input).

A target source code portion, in the target language, can then be generated based on the output(s) generated by processing the intermediate representation (of the base source code portion) using the neural decompiler. For example, where the output(s) include a sequence of output(s), the target source code portion can be generated, token-by-token, by selecting the highest probability token for each output of the sequence.

The generated target source code portion can then be rendered as output of a software development application for optional review and/or editing by developer(s) (programmer(s)). For example, an entire program, or module, can be automatically translated from a base programming language (e.g., C++) to a target language (e.g., Python) by automatically translating portions of the source code as described above. Each of the portions of the source code can be, for example, a line of code, a portion of a line of code, multiple lines of code, and/or other contiguous portions of code.

In some implementations, a method implemented using one or more processors may include: receiving first source code in a first higher-level programming language; processing the first source code, or an intermediate representation of the first source code, using a sequence-to-sequence neural network model to generate a sequence of outputs, wherein each output in the sequence of outputs includes a probability distribution that includes a probability corresponding to each of a plurality of tokens; generating second source code in a second higher-level programming language by, for each output in the sequence of outputs: determining a highest probability in the probability distribution associated with the output; in response to the highest probability exceeding a first threshold, generating a predicted portion of the second source code based on a token of the plurality of tokens that corresponds to the highest probability; and in response to the highest probability not exceeding the first threshold, generating a placeholder; and outputting the second source code.

In various implementations, the second source code is partial source code of a program and includes at least one occurrence of the placeholder, and the method may further include updating the second source code to transform the partial source code of the program into complete source code of the program by, for each of the at least one occurrence of the placeholder: receiving an additional portion of the second source code; and replacing the placeholder with the additional portion of the second source code.

In various implementations, the method may further include compiling the complete source code of the program using a compiler for the second higher-level programming language to generate a compiled representation of the complete source code. In various implementations, in the generating the second source code, in response to the highest probability exceeding the first threshold but not exceeding a second threshold that is higher than the first threshold, the predicted portion of the second source code is flagged as a low-confidence translation.

In various implementations, the second source code includes at least one occurrence of the predicted portion of the second source code flagged as the low-confidence translation, and the method may further include, for each of the at least one occurrence of the predicted portion of the second source code flagged as the low-confidence translation: receiving confirmation that the predicted portion of the second source code flagged as the low-confidence translation is a correct translation of a corresponding portion of the first source code; and retraining the sequence-to-sequence neural network model by using in a feedback loop the confirmation that the predicted portion of the second source code flagged as the low-confidence translation is the correct translation.

In various implementations, the second source code includes at least one occurrence of the predicted portion of the second source code flagged as the low-confidence translation, and the method may further include, for each of the at least one occurrence of the predicted portion of the second source code flagged as the low-confidence translation: receiving a rejection indicating that the predicted portion of the second source code flagged as the low-confidence translation is an incorrect translation of a corresponding portion of the first source code; and retraining the sequence-to-sequence neural network model by using in a feedback loop the rejection indicating that the predicted portion of the second source code flagged as the low-confidence translation is the incorrect translation.

In various implementations, the second source code includes at least one occurrence of the predicted portion of the second source code flagged as the low-confidence translation, and the method may further include, for each of the at least one occurrence of the predicted portion of the second source code flagged as the low-confidence translation: receiving a rejection indicating that the predicted portion of the second source code flagged as the low-confidence translation is an incorrect translation of a corresponding portion of the first source code, and receiving a replacement portion of the second source code; replacing the predicted portion of the second source code flagged as the low-confidence translation with the replacement portion of the second source code; and retraining the sequence-to-sequence neural network model by using in a feedback loop the rejection indicating that the predicted portion of the second source code flagged as the low-confidence translation is the incorrect translation and the replacement portion of the second source code.

In various implementations, the processing is performed on the intermediate representation of the first source code, and the method may further include generating the intermediate representation of the first source code by compiling the first source code using a compiler for the first higher-level programming language.

In another aspect, a computer program product may include one or more computer-readable storage media having program instructions collectively stored on the one or more computer-readable storage media. The program instructions may be executable to: receive first source code in a first higher-level programming language; process the first source code, or an intermediate representation of the first source code, using a neural network model to generate a plurality of outputs, wherein each output in the plurality of outputs includes a probability distribution; generate second source code that is partial source code of a program in a second higher-level programming language by, for each output in the plurality of outputs, generating a predicted portion of the second source code based on the output, in response to a probability in the probability distribution associated with the output exceeding a threshold; receive a selection of a first portion of the predicted portions of the second source code; and in response to receiving the selection of the first portion, generate at least one alternative predicted portion of the second source code.

In another aspect, a system may include a processor, a computer-readable memory, one or more computer-readable storage media, and program instructions collectively stored on the one or more computer-readable storage media. The program instructions may be executable to: receive first source code in a first higher-level programming language; process the first source code, or an intermediate representation of the first source code, using a sequence-to-sequence neural network model to generate a sequence of outputs, wherein each output in the sequence of outputs includes a probability distribution that includes a probability corresponding to each of a plurality of tokens; generate second source code that is partial source code of a program in the second higher-level programming language by, for each output in the sequence of outputs: determining a highest probability in the probability distribution associated with the output; in response to the highest probability exceeding a first threshold and exceeding a second threshold that is higher than the first threshold, generating a predicted portion of the second source code based on a token of the plurality of tokens that corresponds to the highest probability; in response to the highest probability exceeding the first threshold but not exceeding the second threshold, generating a flagged predicted portion of the second source code based on the token of the plurality of tokens that corresponds to the highest probability, wherein the flagged predicted portion of the second source code is flagged for review; and in response to the highest probability not exceeding the first threshold, generating a placeholder; and output the second source code.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 depicts an example application of techniques described herein, in accordance with various implementations.

DETAILED DESCRIPTION

Figure 1:
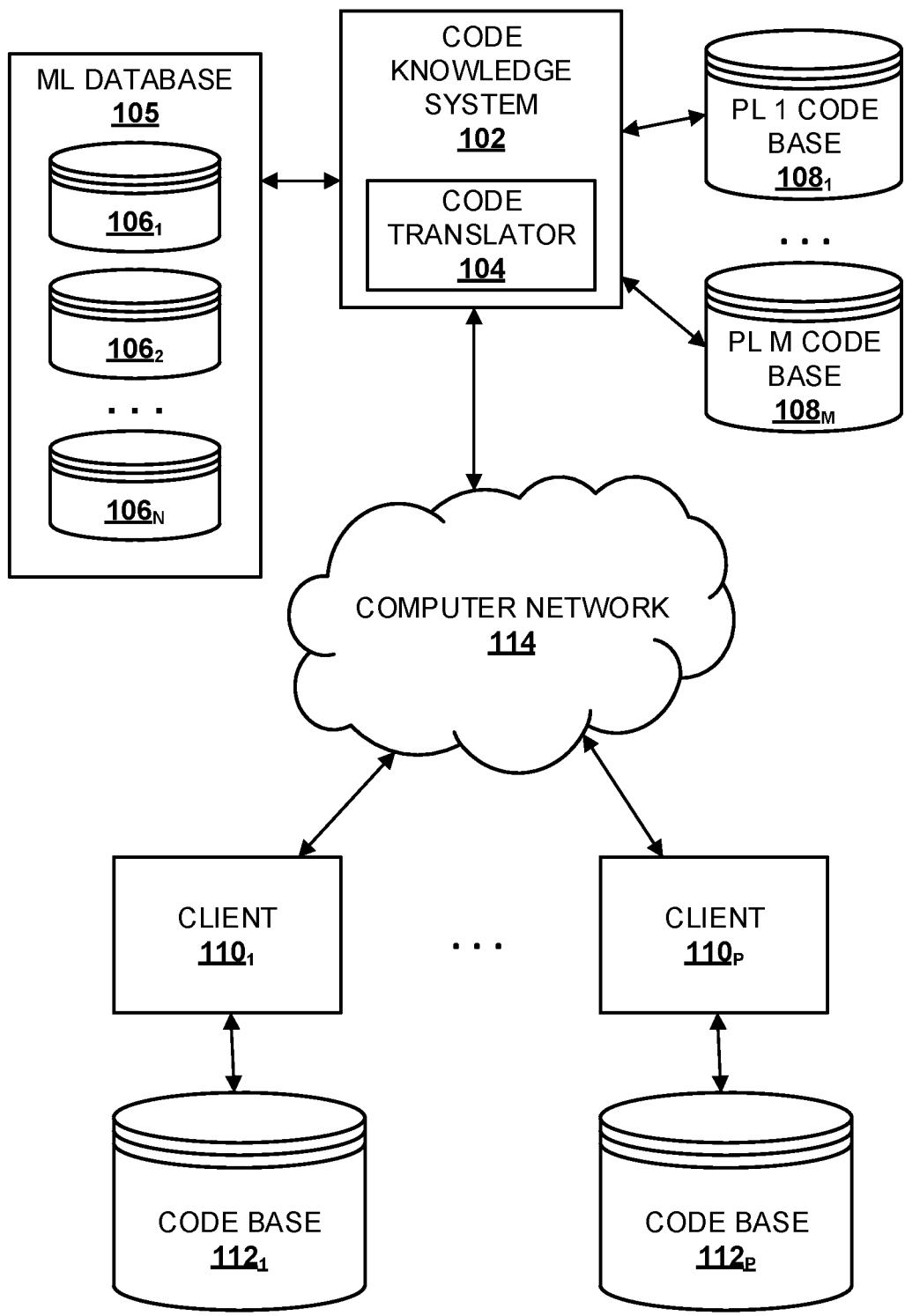
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations.

Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients $110_{1-p}$ manage their respective code bases $112_{1-p}$. The code knowledge system 102 and clients $110_{1-p}$ may be in communication via a computer network 114, which may be any suitable network including any combination of a local area network (LAN), wide area network (WAN), or the Internet. Code knowledge system 102 may include, among other things, a code translator 104 that is configured to perform selected aspects of the present disclosure in order to help one or more clients $110_{1-p}$ to manage and/or make changes to one or more corresponding code bases $112_{1-p}$. Each client $110_{1-p}$ may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flights, managing people associated with flights, such as passengers, air crews, and ground crews, managing airport gates, and so forth.

Code translator 104 may be configured to leverage knowledge of multiple different programming languages in order to aid clients $110_{1-p}$ in translating between programming languages when editing, updating, replatforming, migrating, or otherwise acting upon their code bases $112_{1-p}$. For example, code translator 104 may be configured to enable automatic translation or partial translation of source code from one programming language to another, without requiring any human intervention, and to optionally present the translated source code to a developer for review and potential editing.

In various implementations, code knowledge system 102 may include a machine learning ("ML" in FIG. 1) database 105 that includes data indicative of one or more trained machine learning models $106_{1-N}$. These trained machine learning models $106_{1-N}$ may take various forms that will be described in more detail below, including but not limited to neural networks models such as a sequence-to-sequence neural network model, and any other type of machine learning model that may be applied to facilitate selected aspects of the present disclosure.

In some implementations, code knowledge system 102 may also have access to one or more programming-language-specific code bases $108_{1-m}$. In some implementations, these programming-language-specific code bases $108_{1-m}$ may be used, for instance, to train one or more of the machine learning models $106_{1-N}$.

In various implementations, a client 110 that wishes to enable translation of its code base 112 into programming language(s) other than that/those used originally to write the source code may establish a relationship with an entity (not depicted in FIG. 1) that hosts code knowledge system 102. When a developer wishes to translate source code (e.g., source code of a program included in the entity's code base 112), code translator 104 may provide a version of the source code that is translated to a target programming language specified by the developer. In some such implementations, code translator 104 may generate the translated source code on the fly, e.g., in real time. In other implementations, code translator 104 may operate, e.g., in a batch mode, to preemptively translate all or selection portions of source code included in an entity's code base 112 into a target programming language. In some implementations, the developer may review and edit the translated source code, including viewing and selecting alternate translations for portions of the source code provided by the code translator 104.

Figure 2:
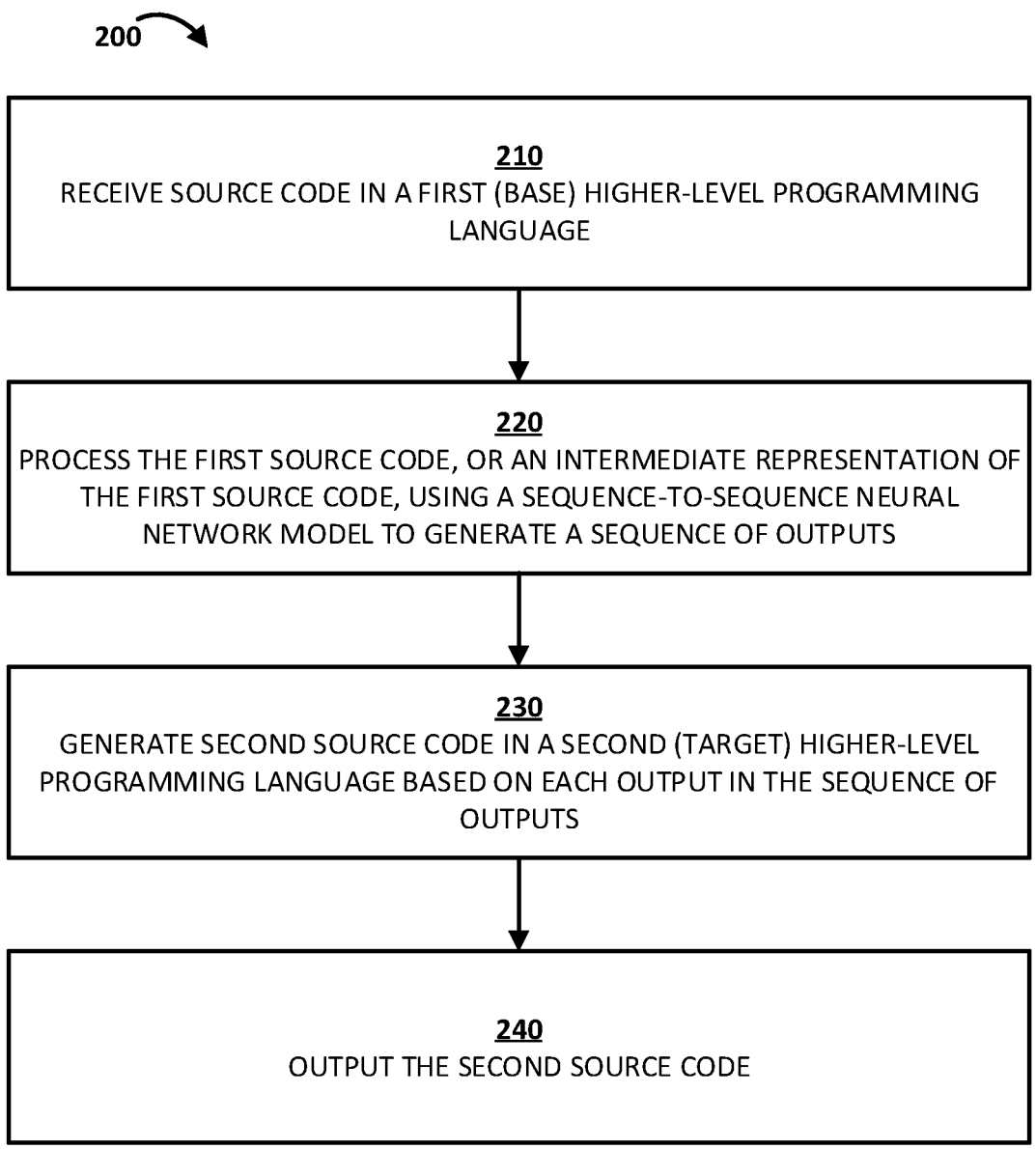
FIG. 2 depicts a flowchart illustrating an example method for practicing selected aspects of the present disclosure.

FIG. 2 is a flowchart illustrating an example method 200 of automatically translating source code in a "base" programming language to source code in another programming language, or "target" programming language, in accordance with implementations disclosed herein. For convenience, the operations of the flowchart are described with reference to a system that performs the operations. This system may include various components of various computer systems, such as one or more components of code knowledge system 102. Moreover, while operations of method 200 are shown in a particular order, this is not meant to be limiting. One or more operations may be reordered, omitted, or added.

At block 210, the system may receive first source code in a first (base) higher-level programming language (e.g., C, C++). In implementations, block 210 comprises the code translator 104 of the code knowledge system 102 receiving first source code in a first higher-level programming language from one of the code bases $112_{1-p}$ via one of the clients $110_{1-p}$, e.g., in response to a request, received from one of one of the clients $110_{1-p}$, to translate the first source code from the first (base) higher-level programming language to a second (target) higher-level programming language.

Still referring to FIG. 2, at block 220, the system may process the first source code, or an intermediate representation of the first source code, using a sequence-to-sequence neural network model to generate a sequence of outputs. In implementations, block 220 comprises the code translator 104 of the code knowledge system 102 processing the first source code received at block 210 using a sequence-to-sequence sequence neural network model, e.g., one or more of the trained machine learning models $106_{1-N}$ in the machine learning database 105, to generate a sequence of outputs, each output including a probability distribution that includes a probability corresponding to each of a plurality of tokens.

In other implementations, block 220 comprises the code translator 104 of the code knowledge system 102 processing the first source code received at block 210 to generate an intermediate representation of the first source code, and then processing the intermediate representation of the first source code using a sequence-to-sequence sequence neural network model, e.g., one or more of the trained machine learning models $106_{1-N}$ in the machine learning database 105, to generate a sequence of outputs, each output including a probability distribution that includes a probability corresponding to each of a plurality of tokens.

Still referring to block 220, in some implementations, the intermediate representation can be a lower-level representation generated using a compiler for the base higher-level programming language that generates a lower-level compiled representation of the source code. The complier may be included in the code translator 104, may be a separate program module (not shown) in the code knowledge system 102, or may be implemented by another system (not shown) external to the code knowledge system 102. As used herein, the "lower-level representation" can refer to bytecode, object code, binary code, assembly code, or any other representation of source code that is less human-readable than source code from which the lower-level representation was generated.

Still referring to block 220, in other implementations, the intermediate representation can be a natural language intermediate representation. For example, one or more of the trained machine learning models $106_{1-N}$ in the machine learning database 105 can be used to translate the source code programmed in the base higher-level programming language to a natural language intermediate representation. For instance, one or more of the trained machine learning models $106_{1-N}$ can be trained based on training instances with base source code, natural language pairs. The natural language paired with a corresponding instance of source code in a training instance can be, for example, natural language that conforms to docstring(s) for the instance of source code or is based on such docstring(s) (e.g., a variant that omits and/or replace(s) term(s) of the docstring(s)).

Still referring to block 220, in some implementations, the code translator 104 processes the intermediate representation (e.g., lower-level compiled representation or natural language representation) using machine learning model(s), e.g., one or more of the trained machine learning models $106_{1-N}$ in the machine learning database 105, to generate output(s) indicative of corresponding source code in the second (target) higher-level programming language specified in the request received at block 210. For example, when the intermediate representation is a lower-level compiled representation, it can be processed using a "neural decompiler", which can be a machine learning model trained to decompile lower-level representations to a target higher-level programming language (e.g., Python), to generate output(s). As another example, when the intermediate representation is a natural language intermediate representation, it can be processed using a machine learning model trained to translate the natural language intermediate representation to the target higher-level programming language, to generate output(s).

Still referring to block 220, in some implementations, the machine learning model $106_{1-N}$ used by the code translator 104 can be a sequence-to-sequence neural network model that processes the intermediate representation to generate a sequence of outputs, such as a sequence of outputs that each includes a probability distribution over tokens. Each of the tokens can be a word, word piece, symbol, and/or other token, and the tokens can include those that form a lexicon of the target higher-level programming language, and optionally other tokens (e.g., end of code snippet symbols, canonical variables and/or other variables, etc.). In various implementations, the machine learning model $106_{1-N}$ can be trained based on training instances that each include labeled training instance output of a target source code portion that is in a target programming language, and training instance input that is an intermediate representation (e.g., lower-level representation or natural language representation) of the target source code portion. Where the intermediate representation is the lower-level representation, the training instances can be generated by identifying (e.g., from code repositories such as programming-language-specific code bases $108_{1-M}$) target source code portions, and compiling the target source code portions using a compiler for the target higher-level programming language. Each training instance can include a target source code portion (as output), and its corresponding lower-level compiled representation. Where the intermediate representation is the natural language representation, the training instances can be generated by identifying (e.g., from code repositories) target source code portions, and docstrings and/or other comments for the target source code portions. Each training instance can include a target source code portion (as output), and its corresponding docstring (or variation thereof) (as input).

Still referring to block 220, in other implementations, the machine learning model 106$_{1-N}$ used by the code translator 104 can be a graph neural network model or any other type of neural network model that processes the first source code or an intermediate representation of the first source code to generate an output distribution that includes a plurality of tokens with associated probabilities. In implementations, the graph neural network model processes an intermediate representation of the first source code that may be generated by generating an abstract syntax tree representing the first source code and modeling the abstract syntax tree as a graph structure including nodes in the graph structure that correspond to nodes in the abstract syntax tree and edges in the graph structure that correspond to parent-child relationships in the abstract syntax tree and other program properties such as data flow and control flow.

Still referring to FIG. 2, at block 230, the system may generate second source code in a second (target) higher-level programming language based on each output in the sequence of outputs. In implementations, block 230 comprises the code translator 104 of the code knowledge system 102 generating second source code in the second higher-level programming language specified in the request received at block 210 based on each output in the sequence of outputs generated at block 220. In particular, in some implementations, the code translator 104 may generate the second source code based on each output in the sequence of outputs according to example method 300 illustrated in FIG. 3 and described herein.

Still referring to FIG. 2, at block 240, the system may output the second source code. In implementations, block 240 comprises the code translator 104 of the code knowledge system 102 outputting the second source code in the second higher-level programming language generated at block 230, e.g., to one of the clients 110$_{1-p}$ in response to the request received from the client 110$_{1-p}$ to translate the source code from the first higher-level programming language to the second (target) higher-level programming language.

Figure 3:
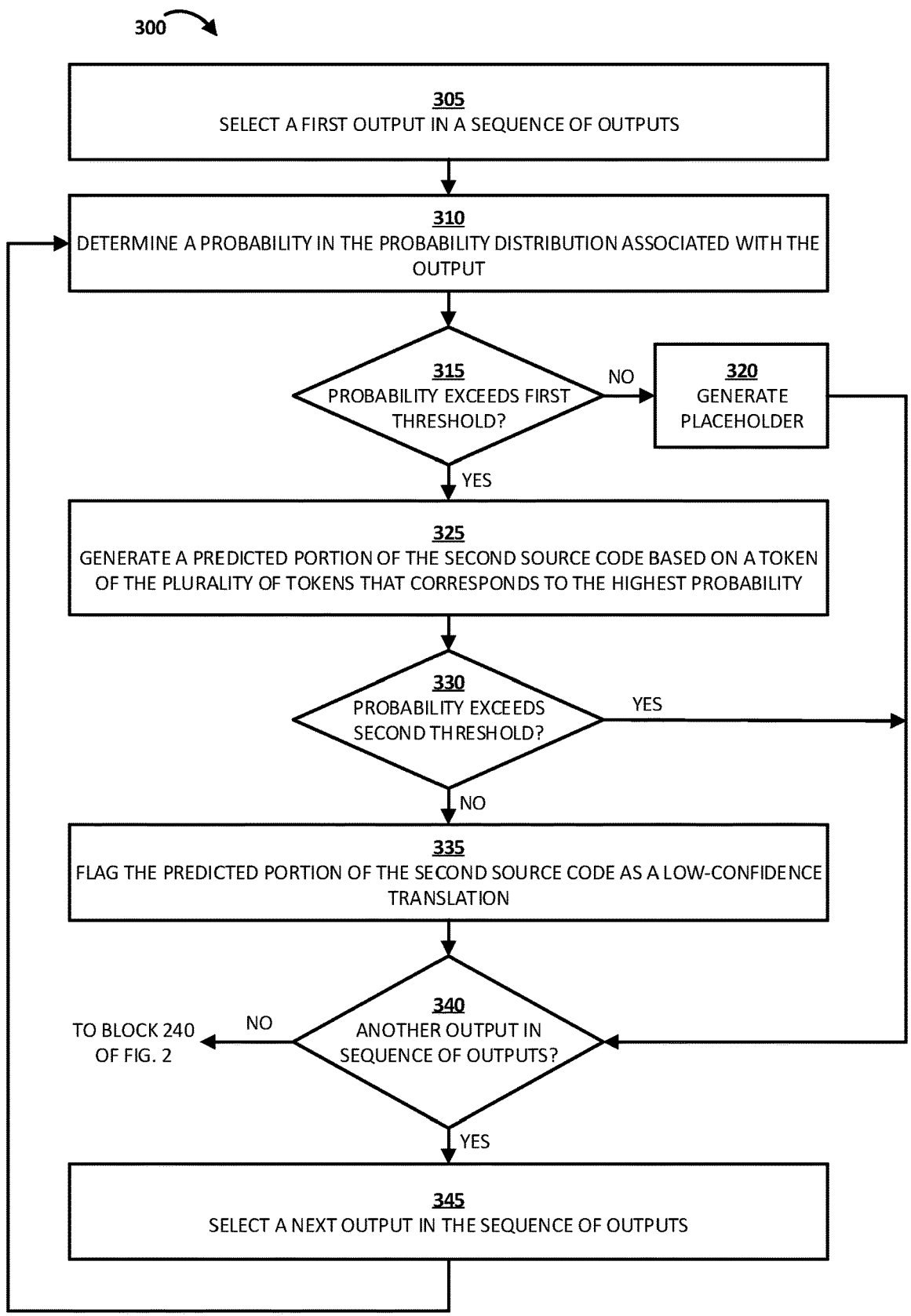
FIG. 3 depicts another flowchart illustrating an example method for practicing selected aspects of the present disclosure.

FIG. 3 is a flowchart illustrating an example method 300 of generating second source code in a second (target) higher-level programming language based on each output in a sequence of outputs generated using a sequence-to-sequence neural network model, in accordance with implementations disclosed herein. For convenience, the operations of the flowchart are described with reference to a system that performs the operations. This system may include various components of various computer systems, such as one or more components of code knowledge system 102. Moreover, while operations of method 300 are shown in a particular order, this is not meant to be limiting. One or more operations may be reordered, omitted, or added.

At block 305, the system may select a first output in a sequence of outputs. In implementations, block 305 comprises the code translator 104 of the code knowledge system 102 selecting a first output in a sequence of outputs generated using a sequence-to-sequence neural network model, e.g., as described with respect to block 220 of FIG. 2. In particular, in implementations, the selected output may include a probability distribution over tokens. Each of the tokens can be a word, word piece, symbol, and/or other token, and the tokens can include those that form a lexicon of the target higher-level programming language, and optionally other tokens (e.g., end of code snippet symbols, canonical variables and/or other variables, etc.). In other implementations, block 305 comprises the code translator 104 of the code knowledge system 102 selecting a first token in an output distribution generated using a graph neural network model or any other type of neural network model, e.g., as described with respect to block 220 of FIG. 2.

Still referring to FIG. 3, at block 310, the system may determine a probability in the probability distribution associated with the output. In implementations, block 310 comprises the code translator 104 of the code knowledge system 102 determining a probability in the probability distribution associated with the output selected at block 305 (or selected at block 345). In some implementations, the code translator 104 of the code knowledge system 102 may select the highest probability in the probability distribution. In other implementations, the code translator 104 of the code knowledge system 102 may select the highest probability in the probability distribution that corresponds to a token that satisfies a particular constraint (e.g., does not violate syntax of the target programming language).

Still referring to FIG. 3, at block 315, the system may determine whether or not the probability exceeds a first threshold. In implementations, block 315 comprises the code translator 104 of the code knowledge system 102 determining whether or not the highest probability selected at block 310 exceeds a first predetermined threshold. In an example, the first predetermined threshold may be 0.6 or any other number. If, at block 315, the code translator 104 of the code knowledge system 102 determines that the highest probability selected at block 310 exceeds the first predetermined threshold, then the flow proceeds to block 325. On the other hand, if the code translator 104 of the code knowledge system 102 determines that the highest probability selected at block 310 does not exceed the first predetermined threshold, then the flow proceeds to block 320.

Still referring to FIG. 3, at block 320, the system may generate a placeholder. In implementations, block 320 comprises the code translator 104 of the code knowledge system 102 generating a placeholder in the second source code that is being generated. In some implementations, the placeholder generated by the code translator 104 may be a comment in the second source code and may incorporate text from a docstring or comment in the first source code. In other implementations, the placeholder generated by the code translator 104 may be a tag, code, or instruction that indicates that a portion of the second source code that is being generated is incomplete. In some implementations, the placeholder may indicate to a developer(s) reviewing the second source code on clients 110$_{1-p}$ (e.g., in an integrated development environment) that the portion of the second source code is incomplete. In other implementations, a development environment(s) running on clients 110$_{1-p}$ may recognize the placeholder and highlight or otherwise flag the incomplete portion of the second source code. The flow may then proceed to block 340.

Still referring to FIG. 3, at block 325, the system may generate a predicted portion of the second source code based on a token of the plurality of tokens that corresponds to the highest probability. In implementations, block 325 comprises the code translator 104 of the code knowledge system 102 generating a predicted portion of the second source code based on a token of the plurality of tokens that corresponds to the highest probability determined at block 310. In some implementations, the code translator 104 generates the predicted portion of the second source code by outputting, as the predicted portion, the word, word piece, and/or symbol to which the highest probability token corresponds. In other implementations, the token may correspond to larger portions of code, for example, a line of code, a portion of a line of code, multiple lines of code, a function, a portion of a function, and/or other contiguous portions of code, which may be output by the code translator 104 as the predicted portion of the second source code.

Still referring to block 325, in some implementations, the code translator 104 of the code knowledge system 102 may annotate the predicted portion of the second source code based on the highest probability determined at block 310. The annotation may be a confidence score that is determined based on the highest probability and that indicates a confidence level that the predicted portion of the second source code generated by the code translator 104 is a correct translation of a corresponding portion of the first source code. The confidence score may allow developers to focus on predicted portions of the second source code which are more likely to be incorrect instead of having to analyze the entire second source code. In some implementations, the confidence score may be in the range of 0 to 1 or 0% to 100%. In other implementations, the confidence score may be one of a predetermined number of confidence levels (e.g., low, medium, high, or 1, 2, 3). In some implementations, the annotation generated by the code translator 104 may be a comment in the second source code that indicates the confidence score. In other implementations, the annotation generated by the code translator 104 may be a tag, code, or instruction that indicates the confidence score. In some implementations, a development environment(s) running on clients $110_{1-p}$ may recognize the annotation and provide a visual indication of the confidence score for the predicted portion of the second source code with which the confidence score is associated. In implementations, the visual indication may be a number, a symbol, a color or shading, or any other type of visual indication that is displayed in a user interface of development environment(s) running on clients $110_{1-p}$.

Still referring to FIG. 3, at block 330, the system may determine whether or not the probability exceeds a second threshold. In implementations, block 330 comprises the code translator 104 of the code knowledge system 102 determining whether or not the highest probability selected at block 310 exceeds a second predetermined threshold that is higher than the first predetermined threshold. In an example, the first predetermined threshold may be 0.6 or any other number, and the second predetermined threshold may be 0.9 or any other number. If, at block 330, the code translator 104 of the code knowledge system 102 determines that the highest probability selected at block 310 exceeds the second predetermined threshold, then the flow proceeds to block 340. On the other hand, if the code translator 104 of the code knowledge system 102 determines that the highest probability selected at block 310 does not exceed the second predetermined threshold, then the flow proceeds to block 335.

Still referring to FIG. 3, at block 335, the system may flag the predicted portion of the second source code as a low-confidence translation. In implementations, block 335 comprises the code translator 104 of the code knowledge system 102 flagging the predicted portion of the second source code that was generated at block 325 as a low-confidence translation of a corresponding portion of the first source code. In some implementations, the flag generated by the code translator 104 may be a comment in the second source code. In other implementations, the flag generated by the code translator 104 may be a tag, code, or instruction that indicates that a portion of the second source code that is being generated is a low-confidence translation of a corresponding portion of the first source code. In some implementations, the flag may indicate to a developer(s) reviewing the second source code on clients $110_{1-p}$ (e.g., in an integrated development environment) that the portion of the second source code is a low-confidence translation of a corresponding portion of the first source code. In other implementations, a development environment(s) running on clients $110_{1-p}$ may recognize the flag and highlight or otherwise indicate that the predicted portion of the second source code is a low-confidence translation of a corresponding portion of the first source code.

Still referring to FIG. 3, at block 340, the system may determine whether or not there is another output in the sequence of outputs. In implementations, block 340 comprises the code translator 104 of the code knowledge system 102 determining whether or not there is another output in the sequence of outputs that has not yet been processed by the code translator 104. If, at block 340, the code translator 104 of the code knowledge system 102 determines that there is another output in the sequence of outputs that has not yet been processed by the code translator 104, then the flow proceeds to block 345. On the other hand, if the code translator 104 of the code knowledge system 102 determines that that there is not another output in the sequence of outputs that has not yet been processed by the code translator 104, then example method 300 of FIG. 3 ends and the flow returns to block 240 of FIG. 2.

Still referring to FIG. 3, at block 345, the system may select a next output in the sequence of outputs. In implementations, block 345 comprises the code translator 104 of the code knowledge system 102 selecting a next output in a sequence of outputs generated using the sequence-to-sequence neural network model, e.g., as described with respect to block 220 of FIG. 2. In other implementations, block 345 comprises the code translator 104 of the code knowledge system 102 selecting a next token in an output distribution generated using a graph neural network model or any other type of neural network model, e.g., as described with respect to block 220 of FIG. 2. The flow then returns to block 310.

Figure 4:
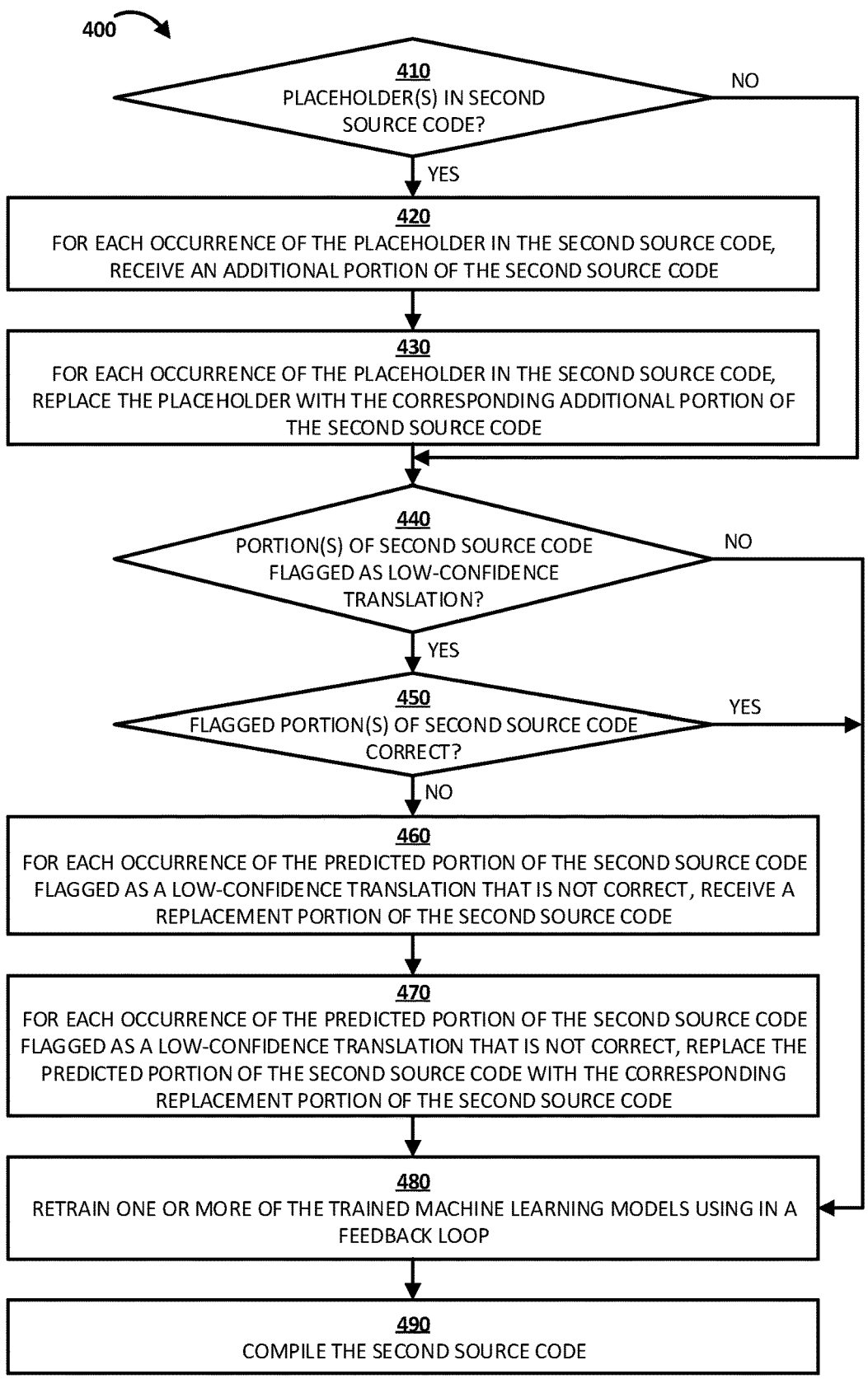
FIG. 4 depicts another flowchart illustrating an example method for practicing selected aspects of the present disclosure.

FIG. 4 is a flowchart illustrating an example method 400 of editing second source code generated according to method 200 of FIG. 2 and method 300 of FIG. 3, in accordance with implementations disclosed herein. For convenience, the operations of the flowchart are described with reference to a system that performs the operations. This system may include various components of various computer systems, such as one or more components of code knowledge system 102. Moreover, while operations of method 400 are shown in a particular order, this is not meant to be limiting. One or more operations may be reordered, omitted, or added.

At block 410, the system may determine whether or not one or more placeholders are present in the second source code. In implementations, block 410 comprises the code translator 104 of the code knowledge system 102 determining whether or not one or more placeholders are present in the second source code generated according to method 200 of FIG. 2. If, at block 410, the code translator 104 determines that one or more placeholders are present in the second source code, then the flow proceeds to block 420. On the other hand, if the code translator 104 of the code knowledge system 102 determines that one or more placeholders are not present in the second source code, then the flow proceeds to block 440.

Still referring to FIG. 4, at block 420, the system, for each occurrence of the placeholder in the second source code, may receive an additional portion of the second source code. In implementations, block 420 comprises the code translator 104 of the code knowledge system 102 receiving, from one or more of the clients $110_{1-p}$, an additional portion of the second source code for each occurrence of the placeholder in the second source code. The additional portion of the second source code may be a portion of the second source code that was written by a developer (e.g., using an integrated development environment) using one or more of the clients $110_{1-p}$.

Still referring to FIG. 4, at block 430, the system, for each occurrence of the placeholder in the second source code, may replace the placeholder with the corresponding additional portion of the second source code. In implementations, block 430 comprises the code translator 104 of the code knowledge system 102 replacing the placeholder with the corresponding additional portion of the second source code received at block 420, thereby transforming second source code which is partial source code of a program into complete source code of a program.

Still referring to FIG. 4, at block 440, the system may determine whether or not one or more predicted portions of the second source code are flagged as a low-confidence translation. In implementations, block 440 comprises the code translator 104 of the code knowledge system 102 determining whether or not one or more predicted portions of the second source code generated according to method 300 of FIG. 3 were flagged as a low-confidence translation at block 335. If, at block 440, the code translator 104 determines that one or more predicted portions of the second source code are flagged as a low-confidence translation, then the flow proceeds to block 450. On the other hand, if the code translator 104 of the code knowledge system 102 determines that it is not the case that one or more predicted portions of the second source code are flagged as a low-confidence translation, then the flow proceeds to block 480.

Still referring to FIG. 4, at block 450, for each of the one or more predicted portions of the second source code that are flagged as a low-confidence translation, the system may determine whether or not the predicted portion of the second source code is correct. In implementations, block 450 comprises the code translator 104 of the code knowledge system 102 determining, for each of the one or more predicted portions of the second source code that are flagged as a low-confidence translation, whether or not the predicted portion of the second source code is a correct translation of the corresponding portion of the first source code. In some implementations, the code translator 104 may receive a confirmation indicating that the predicted portion of the second source code is a correct translation or a rejection indicating that predicted portion of the second source code is an incorrect translation from a developer(s) (e.g., using an integrated development environment) using one or more of the clients $110_{1-p}$. In other implementations, the code translator 104 may determine whether or not the predicted portion of the second source code is a correct translation of the corresponding portion of the first source code based on rules or heuristics, or based on tests that include compiling and/or executing the second source code. If, at block 450, the code translator 104 determines that all of the one or more predicted portions of the second source code flagged as a low-confidence translation are correct (e.g., based on receiving confirmations for all of the one or more predicted portions), then the flow proceeds to block 480. On the other hand, if the code translator 104 of the code knowledge system 102 determines that it is not the case that all of the one or more predicted portions of the second source code flagged as a low-confidence translation are correct (e.g., based on receiving one or more rejections), then the flow proceeds to block 460.

Still referring to FIG. 4, at block 460, for each occurrence of the predicted portion of the second source code flagged as a low-confidence translation that is not correct, the system may receive a replacement portion of the second source code. In implementations, block 460 comprises the code translator 104 of the code knowledge system 102 receiving, from one or more of the clients $110_{1-p}$, a replacement portion of the second source code for each occurrence of the predicted portion of the second source code flagged as a low-confidence translation that is not correct. The replacement portion of the second source code may be a portion of the second source code that was written by a developer (e.g., using an integrated development environment) using one or more of the clients $110_{1-p}$.

Still referring to FIG. 4, at block 470, for each occurrence of the predicted portion of the second source code flagged as a low-confidence translation that is not correct, the system may replace the predicted portion of the second source code with the corresponding replacement portion of the second source code. In implementations, block 470 comprises the code translator 104 of the code knowledge system 102 replacing the predicted portion of the second source code with the corresponding replacement portion of the second source code received at block 460.

Still referring to FIG. 4, at block 480, the system may retrain one or more of the trained machine learning models $106_{1-N}$ in the machine learning database 105 by using in a feedback loop any received additional portions of the second source code, replacement portions of the second source code, confirmations indicating that the predicted portion of the second source code is a correct translation, and/or rejections indicating that predicted portion of the second source code is an incorrect translation. In implementations, block 480 comprises the code translator 104 of the code knowledge system 102 retraining the sequence-to-sequence neural network model, graph neural network model, or other neural network model (used at block 220) in the machine learning database 105 by using in a feedback loop any additional portions of the second source code received at block 420, any replacement portions of the second source code received at block 460, and any confirmations or rejections received at block 450. In other implementations, comments and/or docstrings added to the second source code by a developer (e.g., using an integrated development environment running on one of the clients $110_{1-p}$) may be used in a feedback loop to retrain the sequence-to-sequence neural network model, graph neural network model, or other neural network model.

Still referring to FIG. 4, at block 490, the system may compile the second source code. In implementations, block 490 comprises the code translator 104 of the code knowledge system 102 compiling the second source code using a compiler for the second higher-level programming language included in the code translator 104, causing a compiler for the second higher-level programming language that is a separate module (not shown) in the code knowledge system 102 to compile the second source code, or causing a compiler for the second higher-level programming language that is implemented by another system (not shown) external to the code knowledge system 102 to compile the second source code. In implementations, the second source code is compiled to generate bytecode, object code, binary code, assembly code, or any other compiled representation of source code.

Figure 5:
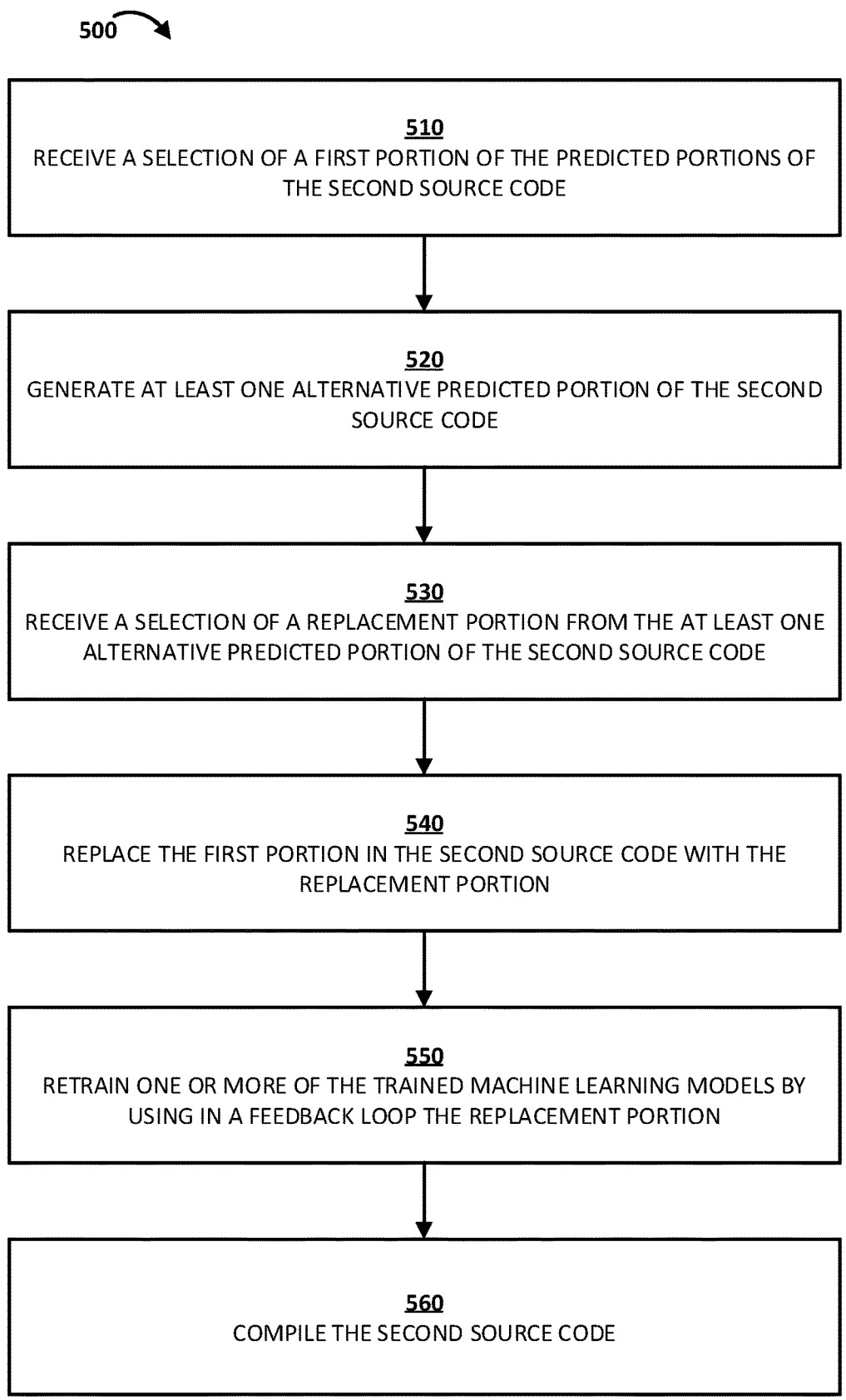
FIG. 5 depicts another flowchart illustrating an example method for practicing selected aspects of the present disclosure.

FIG. 5 is a flowchart illustrating an example method 500 of editing second source code generated according to method 200 of FIG. 2 and method 300 of FIG. 3, in accordance with implementations disclosed herein. For convenience, the operations of the flowchart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted, or added.

At block 510, the system may receive a selection of a first portion of the predicted portions of the second source code. In implementations, block 510 comprises the code translator 104 of the code knowledge system 102 receiving a selection of a first portion of the predicted portions of the second source code generated according to method 200 of FIG. 2 and method 300 of FIG. 3. In implementations, a developer using an integrated development environment running on one of the clients $110_{1-p}$ to review and edit the second source code may select the first portion of the predicted portions of the second source code, and the selection may be sent from the client $110_{1-p}$ to the code translator 104. The code knowledge system 102 may receive the selection of the first portion of the predicted portions of the second source code from one of one of the clients $110_{1-p}$, in response to the developer selecting one of the predicted portions of the second source code in the user interface of the integrated development environment.

Still referring to FIG. 5, at block 520, the system may generate at least one alternative predicted portion of the second source code. In implementations, block 520 comprises the code translator 104 of the code knowledge system 102 generating at least one alternative predicted portion of the second source code in response to receiving the selection of the first portion of the predicted portions of the second source code at block 510. In particular, in implementations, the code translator 104 of the code knowledge system 102 generates at least one alternative predicted portion of the second source code based on tokens of the plurality of tokens that correspond to next highest probabilities (as compared to the highest probability determined at block 310 of FIG. 3) in the probability distribution associated with the output (from block 220 of FIG. 2) that corresponds to the first portion of the predicted portions of the second source code. In some implementations, a development environment(s) running on clients $110_{1-p}$ may display the at least one alternative predicted portion of the second source code.

Still referring to block 520, in some implementations, the code translator 104 generates a predetermined number (e.g., three) of alternative predicted portions of the second source code. In other implementations, a developer reviewing the second source code on one of the clients $110_{1-p}$ in an integrated development environment specifies the number of alternative predicted portions of the second source code to be generated by the code translator 104.

Still referring to block 520, in some implementations, the code translator 104 of the code knowledge system 102 may annotate the alternative portions of the second source code based on the probabilities from the probability distribution associated with the tokens on which the alternative portions of the second source code are based. The annotations may be confidence scores that are determined based on the probabilities from the probability distribution and that indicate a confidence level that the alternative portions of the second source code generated by the code translator 104 are correct translations of a corresponding portion of the first source code. In implementations, the confidence scores associated with the alternative predicted portions generated at block 520 are lower than the confidence score associated with the first portion (selected at block 510) of the predicted portions of the second source code.

Still referring to block 520, in some implementations, the confidence scores may be in the range of 0 to 1 or 0% to 100%. In other implementations, the confidence scores may be one of a predetermined number of confidence levels (e.g., low, medium, high, or 1, 2, 3). In some implementations, the annotations generated by the code translator 104 may be comments in the second source code that indicate the confidence scores. In other implementations, the annotations generated by the code translator 104 may be tags, codes, or instructions that indicate the confidence scores. In some implementations, a development environment(s) running on clients $110_{1-p}$ may recognize the annotations and provide a visual indication of the confidence scores for the alternative portions of the second source code with which the confidence scores are associated. In implementations, the visual indication may be a number, a symbol, a color or shading, or any other type of visual indication that is displayed in a user interface of development environment(s) running on clients $110_{1-p}$.

Still referring to FIG. 5, at block 530, the system may receive a selection of a replacement portion from the at least one alternative predicted portion of the second source code. In implementations, block 530 comprises the code translator 104 of the code knowledge system 102 receiving a selection of a replacement portion from the at least one alternative predicted portion of the second source code generated at block 520. In implementations, a developer using an integrated development environment running on one of the clients $110_{1-p}$ to review the at least one alternative predicted portion of the second source code generated at block 520 may select the replacement portion from the at least one alternative predicted portion, and the selection may be sent from the client $110_{1-p}$ to the code translator 104.

Still referring to FIG. 5, at block 540, the system may replace the first portion in the second source code with the replacement portion. In implementations, block 540 comprises the code translator 104 of the code knowledge system 102 replacing the first portion of the predicted portions of the second source code with the alternative predicted portion of the second source code that was selected as the replacement portion at block 530.

Still referring to FIG. 5, at block 550, the system may retrain one or more of the trained machine learning models $106_{1-N}$ in the machine learning database 105 by using in a feedback loop the replacement portion selected at block 530. In implementations, block 550 comprises the code translator 104 of the code knowledge system 102 retraining the sequence-to-sequence neural network model (used at block 220) in the machine learning database 105 by using in a feedback loop the replacement portion of the second source code received at block 530.

Still referring to FIG. 5, at block 560, the system may compile the second source code. In implementations, block 560 comprises the code translator 104 of the code knowledge system 102 compiling the second source code using a compiler for the second higher-level programming language included in the code translator 104, causing a compiler for the second higher-level programming language that is a separate module (not shown) in the code knowledge system 102 to compile the second source code, or causing a compiler for the second higher-level programming language that is implemented by another system (not shown) external to the code knowledge system 102 to compile the second source code. In implementations, the second source code is compiled to generate bytecode, object code, binary code, assembly code, or any other compiled representation of source code.

FIG. 6 depicts an example of how first source code written in a base higher-level programming language may be translated to second source code written in a target higher-level programming language. In this example, the first source code 600 is written in Java and prints the integers one to five, instantiates an object named object1 of the MyCustomObject class, and calls the doSomething( )method of object1. At bottom, a graphical user interface ("GUI") 610 is depicted that may be used by a developer to translate the first source code written in the base higher-level programming language to the second source code written in the target higher-level programming language. In this example, the first source code 600 written in Java is converted to the second source code by code translator 104 into Python and rendered as part of GUI 610. In this way, the developer operating GUI 610 may review the translated second source code. In some cases, the developer may be able to edit the translated second source code.

In some implementations, the GUI 610 may display annotations (confidence scores) corresponding to predicted portions of the second source code, such as annotations 620, 630, and 640. In an example, annotations corresponding to predicted portions of the second source code associated with relatively higher confidence scores, including annotations 620, 630, may be displayed in a first color (e.g., green), and annotations corresponding to predicted portions of the second source code associated with relatively lower confidence scores, including annotation 640, may be displayed in a second color (e.g., yellow or orange). In some implementations, the GUI 610 may also display placeholders such as placeholder 650 in a third color (e.g., red).

In some implementations, in response to a developer selecting (e.g., clicking on) one of the annotations 620, 630, 640, the GUI 610 may generate at least one alternative predicted portion of the second source code (e.g., as described with respect to block 520).

In some implementations, the first source code 600 may be sent to code knowledge system 102 for translation by code translator 104, e.g., in response to a translation request from the developer operating GUI 610. In other implementations, GUI 610 may be part of a software development application that performs the programming language translation locally, e.g., using a plug in or built-in functionality. The scenario of FIG. 6 is for illustrative purposes only. Source code may be translated between programming languages using techniques described herein for any number of applications.

In some implementations, techniques described herein may be used to automatically convert source code written in one programming language into source code in another programming language, without necessarily presenting translated source code to users as described previously. For example, a company may decide to replatform an existing code base 112 to a new programming language, e.g., to obtain new functionality and/or technical benefits (e.g., security features, processing speed features, etc.) that were unavailable with the original programming language. Such a company may be able to deploy techniques described herein, or request that an entity associated with code knowledge system 102 deploy techniques described herein, to automatically convert all or a portion of a code base 112 from one programming language to another.

Techniques described herein may be utilized to provide programmers, e.g., operating clients $110_{1-p}$, with tools that facilitate translation between a source programming language and/or one or more target programming languages. These tools may be provided, for instance, as features or plugins associated with a software development tool or integrated development environment. These tools may enable programmers to translate their source code to another programming language.

Figure 7:
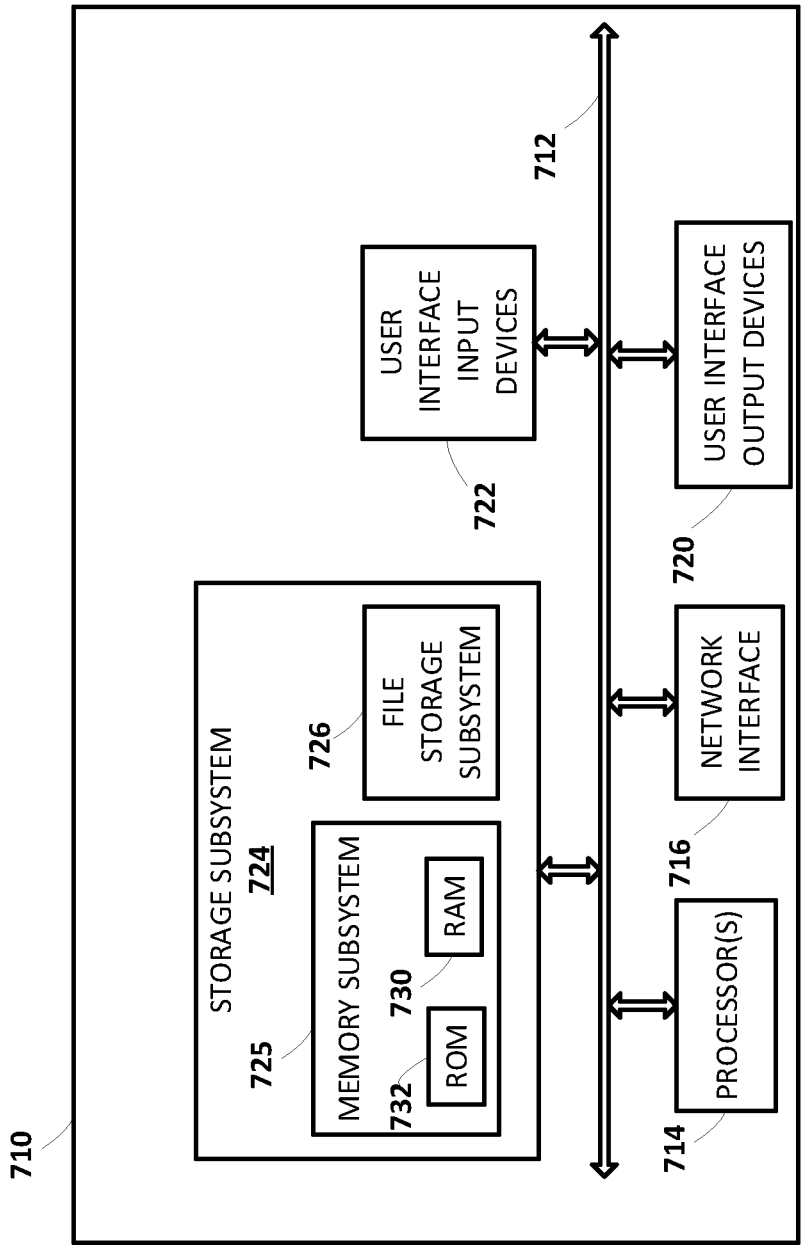
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 2-5, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

Implementations may address problems with device resource usage in the translation of code from a base higher-level programming language to a target higher-level programming language by providing methods and systems for automatically translating source code. In particular, some implementations may improve the functioning of a computer by providing methods and systems for automatically translating source code in a base programming language to source code in a target programming language. Additionally, some implementations may improve the functioning of a computer by providing methods and systems for generating source code in a target higher-level programming language based on each output in a sequence of outputs generated using a sequence-to-sequence neural network model. Accordingly, through the use of rules that improve computer-related technology, implementations allow computer performance of functions not previously performable by a computer. Additionally, implementations use techniques that are, by definition, rooted in computer technology (e.g., machine learning models, neural networks, compliers, integrated development environments, etc.).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving first source code in a first higher-level programming language;
   processing the first source code, or an intermediate representation of the first source code, using a sequence-to-sequence neural network model to generate a sequence of outputs, wherein each output in the sequence of outputs comprises a probability distribution that includes a probability corresponding to each of a plurality of tokens;
   generating second source code in a second higher-level programming language by, for each output in the sequence of outputs:
      determining a highest probability in the probability distribution associated with the output;
      in response to the highest probability exceeding a first threshold, generating a predicted portion of the second source code based on a token of the plurality of tokens that corresponds to the highest probability, wherein in response to the highest probability exceeding the first threshold but not exceeding a second threshold that is higher than the first threshold, the predicted portion of the second source code is flagged as a low-confidence translation; and
      in response to the highest probability not exceeding the first threshold, generating a placeholder;
   outputting the second source code, wherein the second source code includes at least one occurrence of the predicted portion of the second source code flagged as the low-confidence translation; and
   for each of the at least one occurrence of the predicted portion of the second source code flagged as the low-confidence translation:
      receiving confirmation that the predicted portion of the second source code flagged as the low-confidence translation is a correct translation of a corresponding portion of the first source code; and
      retraining the sequence-to-sequence neural network model by using in a feedback loop the confirmation that the predicted portion of the second source code flagged as the low-confidence translation is the correct translation.

2. The method according to claim 1, wherein the second source code is partial source code of a program and includes at least one occurrence of the placeholder, and
   further comprising updating the second source code to transform the partial source code of the program into complete source code of the program by, for each of the at least one occurrence of the placeholder:
      receiving an additional portion of the second source code; and
      replacing the placeholder with the additional portion of the second source code.

3. The method according to claim 2, further comprising compiling the complete source code of the program using a compiler for the second higher-level programming language to generate a compiled representation of the complete source code.

4. The method according to claim 1, wherein the processing is performed on the intermediate representation of the first source code, and
   further comprising generating the intermediate representation of the first source code by compiling the first source code using a compiler for the first higher-level programming language.

5. A method implemented by one or more processors, the method comprising:
receiving first source code in a first higher-level programming language;
processing the first source code, or an intermediate representation of the first source code, using a sequence-to-sequence neural network model to generate a sequence of outputs, wherein each output in the sequence of outputs comprises a probability distribution that includes a probability corresponding to each of a plurality of tokens;
generating second source code in a second higher-level programming language by, for each output in the sequence of outputs:
determining a highest probability in the probability distribution associated with the output;
in response to the highest probability exceeding a first threshold, generating a predicted portion of the second source code based on a token of the plurality of tokens that corresponds to the highest probability, wherein in response to the highest probability exceeding the first threshold but not exceeding a second threshold that is higher than the first threshold, the predicted portion of the second source code is flagged as a low-confidence translation; and
in response to the highest probability not exceeding the first threshold, generating a placeholder;
outputting the second source code, wherein the second source code includes at least one occurrence of the predicted portion of the second source code flagged as the low-confidence translation; and
for each of the at least one occurrence of the predicted portion of the second source code flagged as the low-confidence translation:
receiving a rejection indicating that the predicted portion of the second source code flagged as the low-confidence translation is an incorrect translation of a corresponding portion of the first source code; and
retraining the sequence-to-sequence neural network model by using in a feedback loop the rejection indicating that the predicted portion of the second source code flagged as the low-confidence translation is the incorrect translation.

6. A method implemented by one or more processors, the method comprising:
receiving first source code in a first higher-level programming language;
processing the first source code, or an intermediate representation of the first source code, using a sequence-to-sequence neural network model to generate a sequence of outputs, wherein each output in the sequence of outputs comprises a probability distribution that includes a probability corresponding to each of a plurality of tokens;
generating second source code in a second higher-level programming language by, for each output in the sequence of outputs:
determining a highest probability in the probability distribution associated with the output;
in response to the highest probability exceeding a first threshold, generating a predicted portion of the second source code based on a token of the plurality of tokens that corresponds to the highest probability, wherein in response to the highest probability exceeding the first threshold but not exceeding a second threshold that is higher than the first threshold, the predicted portion of the second source code is flagged as a low-confidence translation; and
in response to the highest probability not exceeding the first threshold, generating a placeholder;
outputting the second source code, wherein the second source code includes at least one occurrence of the predicted portion of the second source code flagged as the low-confidence translation: and
for each of the at least one occurrence of the predicted portion of the second source code flagged as the low-confidence translation:
receiving a rejection indicating that the predicted portion of the second source code flagged as the low-confidence translation is an incorrect translation of a corresponding portion of the first source code, and receiving a replacement portion of the second source code;
replacing the predicted portion of the second source code flagged as the low-confidence translation with the replacement portion of the second source code; and
retraining the sequence-to-sequence neural network model by using in a feedback loop the rejection indicating that the predicted portion of the second source code flagged as the low-confidence translation is the incorrect translation and the replacement portion of the second source code.

7. A computer program product comprising one or more non-transitory computer-readable storage media having program instructions collectively stored on the one or more non-transitory computer-readable storage media, the program instructions executable to:
receive first source code in a first higher-level programming language;
process the first source code, or an intermediate representation of the first source code, using a neural network model to generate a plurality of outputs, wherein each output in the plurality of outputs comprises a probability distribution, the probability distribution including a probability corresponding to each of a plurality of tokens;
generate second source code that is partial source code of a program in a second higher-level programming language by, for each output in the plurality of outputs, generating a predicted portion of the second source code based on the output, in response to a probability in the probability distribution associated with the output exceeding a threshold, wherein the predicted portion of the second source code is generated based on a token of the plurality of tokens that corresponds to a highest probability in the probability distribution;
receive a selection of a first portion of the predicted portions of the second source code, wherein the first portion is annotated with a score based on the highest probability; and
in response to receiving the selection of the first portion, generate at least one alternative predicted portion of the second source code,
wherein:
each of the at least one alternative predicted portion is annotated with a score based on a probability in the probability distribution corresponding to a token of the plurality of tokens on which the alternative predicted portion is based, and for each of the at least one alternative predicted portion, the score associated with the alternative predicted portion is lower than the score associated with the first portion.

8. The computer program product according to claim 7, wherein the program instructions are further executable to:
receive a selection of a replacement portion from the at least one alternative predicted portion of the second source code; and
replace the first portion in the second source code with the replacement portion.

9. The computer program product according to claim 8, wherein the program instructions are further executable to retrain the neural network model by using in a feedback loop the selection of the replacement portion.

10. The computer program product according to claim 7, wherein the generating the second source code further comprises, for each output in the plurality of outputs, generating a placeholder, in response to a highest probability in the probability distribution associated with the output not exceeding the threshold.

11. The computer program product according to claim 10, wherein:
the second source code includes at least one occurrence of the placeholder; and
the program instructions are further executable to update the second source code to transform the partial source code of the program into complete source code of the program by, for each of the at least one occurrence of the placeholder:
receiving an additional portion of the second source code; and
replacing the placeholder with the additional portion of the second source code.

12. The computer program product according to claim 7, wherein:
the processing is performed on the intermediate representation of the first source code, and
the neural network model is a graph neural network model, and
further comprising generating the intermediate representation of the first source code by generating an abstract syntax tree representing the first source code and modeling the abstract syntax tree as a graph structure including nodes in the graph structure that correspond to nodes in the abstract syntax tree and edges in the graph structure that correspond to parent-child relationships in the abstract syntax tree.

13. A system comprising:
a processor, a computer-readable memory, one or more computer-readable storage media, and program instructions collectively stored on the one or more computer-readable storage media, the program instructions executable to:
receive first source code in a first higher-level programming language;
process the first source code, or an intermediate representation of the first source code, using a sequence-to-sequence neural network model to generate a sequence of outputs, wherein each output in the sequence of outputs comprises a probability distribution that includes a probability corresponding to each of a plurality of tokens;
generate second source code that is partial source code of a program in the second higher-level programming language by, for each output in the sequence of outputs:
determining a highest probability in the probability distribution associated with the output;
in response to the highest probability exceeding a first threshold and exceeding a second threshold that is higher than the first threshold, generating a predicted portion of the second source code based on a token of the plurality of tokens that corresponds to the highest probability;
in response to the highest probability exceeding the first threshold but not exceeding the second threshold, generating a flagged predicted portion of the second source code based on the token of the plurality of tokens that corresponds to the highest probability, wherein the flagged predicted portion of the second source code is flagged for review; and
in response to the highest probability not exceeding the first threshold, generating a placeholder; and
output the second source code.

14. The system according to claim 13, wherein the program instructions are further executable to annotate each of the predicted portion of the second source code and the flagged predicted portion of the second source code with a confidence score based on the highest probability.

15. The system according to claim 13, wherein the second source code includes at least one occurrence of the flagged predicted portion of the second source code and at least one occurrence of the placeholder, and the program instructions are further executable to transform the partial source code of the program into complete source code of the program by:
for each of the at least one occurrence of the flagged predicted portion of the second source code:
receiving a confirmation indicating whether or not the flagged predicted portion of the second source code is a correct translation of a corresponding portion of the first source code; and
in response to the confirmation indicating that the flagged predicted portion of the second source code is not the correct translation, receiving a replacement portion of the second source code and replacing the flagged predicted portion of the second source code with the replacement portion of the second source code; and
for each of the at least one occurrence of the placeholder:
receiving an additional portion of the second source code; and
replacing the placeholder with the additional portion of the second source code.

16. The system according to claim 15, wherein the program instructions are further executable to retrain the sequence-to-sequence neural network model by using in a feedback loop the confirmation indicating whether or not the flagged predicted portion of the second source code is the correct translation, the replacement portion of the second source code, and the additional portion of the second source code.

17. The system according to claim 15, further comprising compiling the complete source code of the program using a compiler for the second higher-level programming language to generate a compiled representation of the complete source code.

18. The system according to claim 13, wherein the second source code includes at least one occurrence of the flagged predicted portion of the second source code, and the program instructions are further executable to, for at least one of the flagged predicted portion of the second source code:
receive a confirmation indicating that the flagged predicted portion of the second source code is not a correct translation; and in response to the confirmation indicating that the flagged predicted portion of the second source code is not the correct translation, generate at least one alternative predicted portion of the second source code.

* * * * *